(12) United States Patent
Kingsford

(10) Patent No.: US 8,060,935 B2
(45) Date of Patent: Nov. 15, 2011

(54) SECURITY INCIDENT IDENTIFICATION AND PRIORITIZATION

(75) Inventor: Bryan E. Kingsford, Orem, UT (US)

(73) Assignee: Symantec Corporation, Mountain View, CA (US)

( * ) Notice: Subject to any disclaimer, the term of this patent is extended or adjusted under 35 U.S.C. 154(b) by 840 days.

(21) Appl. No.: 12/069,872

(22) Filed: Feb. 12, 2008

(65) Prior Publication Data

US 2008/0141370 A1    Jun. 12, 2008

Related U.S. Application Data

(63) Continuation of application No. 10/677,630, filed on Oct. 1, 2003, now Pat. No. 7,356,843.

(51) Int. Cl.
*G06F 11/00*    (2006.01)

(52) U.S. Cl. ............... 726/22; 726/23; 726/24; 726/25; 713/165; 713/167; 713/176; 707/702

(58) Field of Classification Search ............. 726/22–25; 713/165, 167, 176; 707/702
See application file for complete search history.

(56) References Cited

U.S. PATENT DOCUMENTS

| 6,038,564 A | * | 3/2000 | Sameshima et al. | .......... 707/702 |
| 7,043,634 B2 | * | 5/2006 | Wolff et al. | .................... 713/165 |

* cited by examiner

*Primary Examiner* — Thanhnga Truong
(74) *Attorney, Agent, or Firm* — Wilmer Cutler Pickering Hale and Dorr LLP

(57) ABSTRACT

Techniques are disclosed for protecting a computer environment. The technique comprises providing an index; comparing a first event with the index; determining whether the first event is unusual; and determining whether a security incident associated with the first event has occurred.

20 Claims, 3 Drawing Sheets

SECURITY INCIDENT IDENTIFICATION AND PRIORITIZATION

CROSS REFERENCE TO OTHER APPLICATIONS

This application is a continuation of U.S. patent application Ser. No. 10/677,630, now U.S. Pat. No. 7,356,843 entitled SECURITY INCIDENT IDENTIFICATION AND PRIORITIZATION filed Oct. 1, 2003 which is incorporated herein by reference for all purposes.

FIELD OF THE INVENTION

The present invention relates generally to computer environments. More specifically, a technique for computer security is disclosed.

BACKGROUND OF THE INVENTION

Network security is an important issue in modern computer environments. In computer environments such as computer networks, activities and events are sometimes monitored using products such as firewalls and intrusion detection systems (IDS). Network administrators may be alerted when suspicious events or security incidents occur so that they may take appropriate actions.

Monitored systems often generate large volumes of network events such as traffic sessions, logins, probes, etc. The amount of data available sometimes makes it difficult to identify events that pose risks to the system. Sifting through the events to identify the security incidents is typically resource intensive, therefore the systems that support incident identification tend to be slow and expensive. It would be useful to have a technique that would more efficiently and accurately identify security incidents. The present invention addresses such needs

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and invention may be practiced according to the claims without some or all of these specific details. For the purpose of clarity, technical material that is known in the technical fields related to the invention has not been described in detail so that the invention is not unnecessarily obscured.

A technique for protecting a computer environment is disclosed. In some embodiments, security incidents are identified by comparing an event with an index and determining whether the event is unusual. In some embodiments, the index includes an archive index. In some embodiments, the event may be a file modification. In the following examples, file modification is discussed for the purposes of illustration. It should be noted that the technique is also applicable to other types of events and indexes, and the criteria for determining whether an event is unusual may be different in some embodiments.

Figure 1:
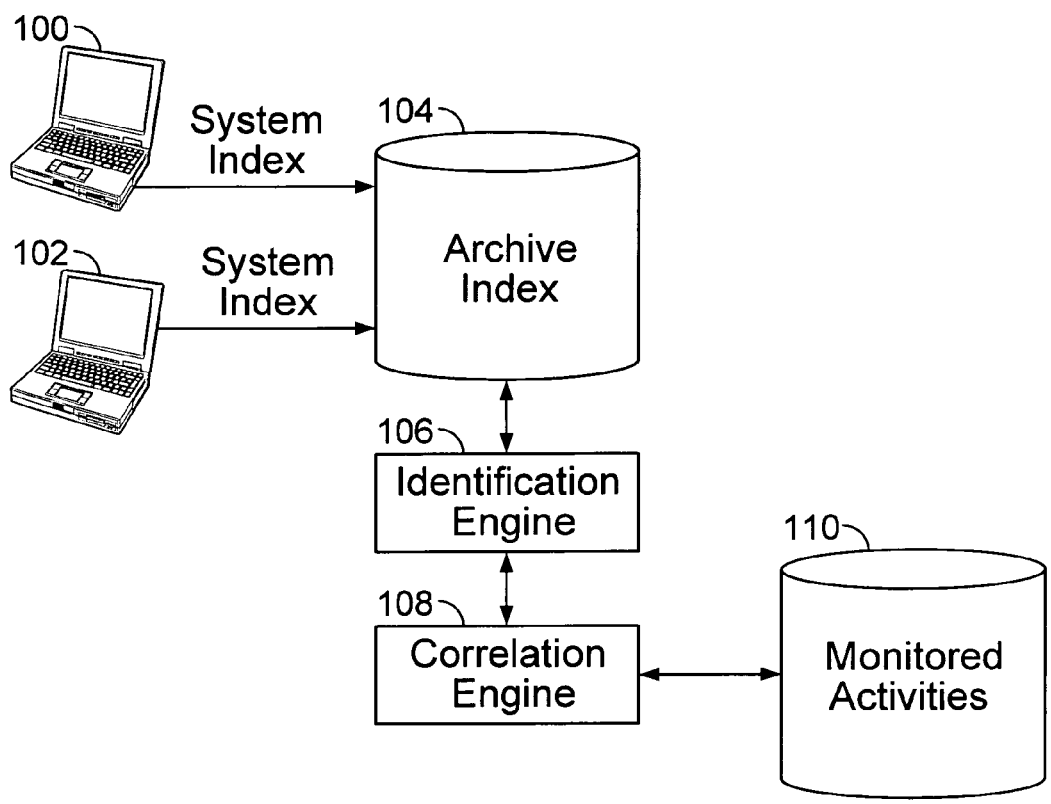
FIG. 1 is a block diagram illustrating a computer environment configured to identify security incidents, according to one embodiment.

FIG. 1 is a block diagram illustrating a computer environment configured to identify security incidents, according to one embodiment. Security incidents refer to activities that threaten the security of the computer system. One important aspect of network security is the assurance of the integrity of electronic files. If a file is lost or its integrity is compromised, the system becomes vulnerable to attack and the security of the network becomes threatened. For example, installing an unauthorized patch or program may weaken the system and expose it to attackers. Being able to monitor unusual modifications in the files on a network or other types of unusual activities would improve the security system's ability to prevent attack.

In this embodiment, to identify security incidents, information about files on the system is stored in indexes and modifications to files are detected using the indexes and correlated with other monitored activities. The system is shown to include devices such as 100 and 102, which may be servers, personal computers, laptops, networking appliances, personal digital assistants or any other appropriate devices that may be connected to the computer network. System indexes for the devices can be generated based on the files on the devices.

In some embodiments, the indexes are sent to an archive index 104. The archive index can include the initial states of the files on the devices and a revision history for tracking the files that have been modified. As used herein, a modified file refers to a file that is changed, deleted, added or otherwise altered. More details of the system index and archive index are discussed below. In some embodiments, a device may cache a subset of the archive index for efficiency. An identification engine 106 can identify the files that have been modified and can determine how important a modification is.

The identification engine selectively sends events indicating file modifications to a correlation engine 108. The correlation engine may be an off-the-shelf event correlation product such as Symantec's Incident Manager, Manhunt, Post Intrusion Detector, etc. The correlation engine correlates the file modification event with other monitored activities 110 to determine whether a security incident has occurred. While a file modification on its own may not indicate a threat to the network, if analyzed with other related activities, they may together present a high priority security incident. For example, if a system is probed, and an unusual file appears on the probed system shortly after, an analysis on these events as a whole may indicate that an unauthorized person has gained access to the system and may launch an attack soon. In some embodiments, the priority of the security incident is proportional to the risk posed to the system. Logs, alerts and other appropriate actions may take place once a security incident is determined.

Figure 2:
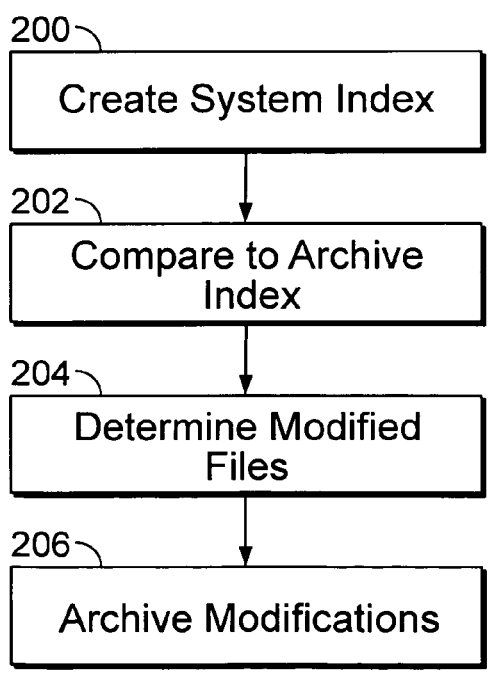
FIG. 2 is a flowchart illustrating an archiving process according to one embodiment.

FIG. 2 is a flowchart illustrating an archiving process according to one embodiment. The process may be used to create the initial archive index as well as to update modifications. The system may be repeated periodically or when a certain number of files on a system have been modified. In this example, a system index used to identify files on a device is created (200). For the purposes of illustration, the following examples discuss in detail system indexes including file signatures that are generated based on the contents of the files on the device; although it should be noted that other appropriate file identifiers may also be used. To create a signature, a signature function such as a checksum function, a hash function or some other appropriate function can be applied to a file.

The system index is then compared to the archive index (202). In some embodiments, the signatures in the system index are looked up in the archive index that includes a collection of file signatures from different devices. The signatures in the archive index include both signatures for files that are on the devices at the time the archive index is initialized, and signatures for revised, added or deleted files between updates. Thus, the archive index provides "snapshots" of file information. The archive index may be a database, an XML file or some other appropriate data storage that that allows for the lookup of file signatures.

After the system index is compared to the archive index, the modified files are determined (204). In some embodiments, the modified files are files that correspond to signatures that are not found in the archive index. The modifications are archived (206). The signatures are stored in the archive index and the modified files may also be backed up in a file archive configured to store copies of the modified files.

In one example, the signature includes a checksum and the system index is an Extensible Markup Language (XML) file. A device that includes two files has the following system index file:

```
<system_index path='//systema/c$'>
    <directory name='WINNT'>
        <file name='winhelp.exe' signature='13465313432423'>
        </file>
        <file name='winhlp32.exe' checksum='134262434343'>
        </file>
    </directory>
</system_index>
```

If the signature corresponding to the file "winhelp.exe" is not found in the archive index, winhelp.exe is then determined to be a modified file and its signature is stored in the archive index. The file itself is saved to an archive file for backup. In this case, the archive file is a zip file named a910.zip. More than one modified file may be compressed and backed up in an archive file and multiple archive files may be used when there are many modified files to be backed up.

The archive index is an XML file and the portion for tracking this modification is shown as the following:

```
<index zipfile='a910.zip'>
    <entry name='//system/c$/winnt/winhelp.exe' checksum=
    '13465313432423'/>
</index>
```

Figure 3:
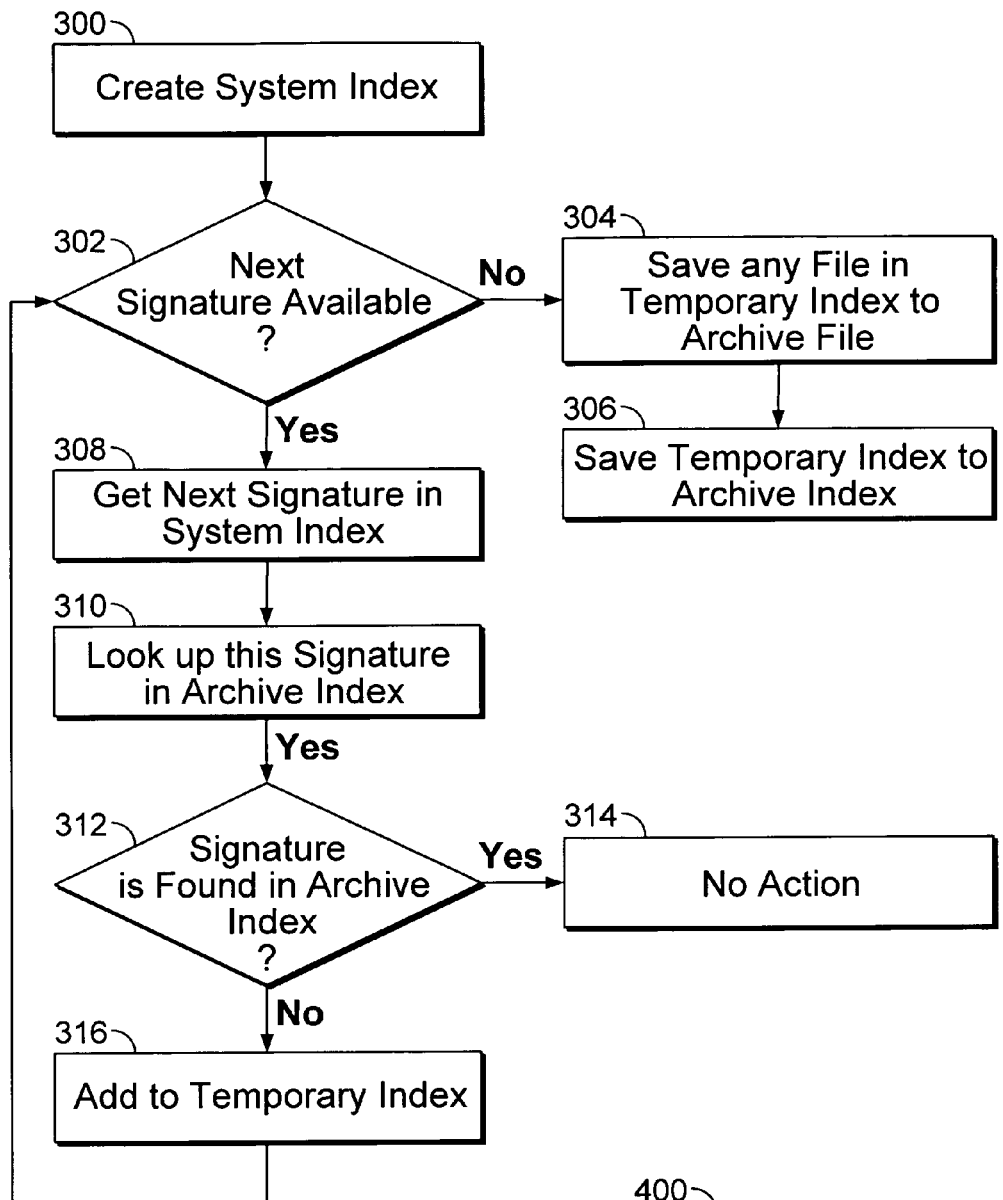
FIG. 3 is a flowchart illustrating an archiving process according to another embodiment.

FIG. 3 is a flowchart illustrating an archiving process according to another embodiment. In this example, a system index is created based on files stored on a device (300). During the initialization phase, the signatures for files on the device are included in the system index. In some embodiments, signatures for all the files on the device are included; in some embodiments, selected files are included and the selection criteria may be based on the file type, how frequently a file changes, whether the file is a part of a standard installation, etc. The signatures in the system index are then processed. It is determined whether the next signature is available (302). If the signature is available, it is retrieved from the system index (308). This signature is then looked up in the archive index (310). In some embodiments, the lookup is done by comparing the signature included in the signature with the signatures stored in the archive index. It is then determined whether the signature is found in the archive index (312). If the signature is found in the archive index, it indicates that the corresponding file has been stored previously, and is therefore less likely to be harmful. No action is required at this point (314). If, however, the signature is not found in the archive index, it then indicates that the file is new and that the signature is added to a temporary index (316). Control is then transferred to 302 to process the next signature.

Once all the signatures are processed, the temporary index includes the signatures for files that have not been stored previously and control is transferred to 304 to store the corresponding files to one or more archive files (304). The temporary index is then saved to the archive index (306). At initialization time, since no signature is stored in the archive index yet, all the file signatures are deemed new and archived.

The archiving process is repeated thereafter for updates. During the update phase, the system index includes file signatures for files that have been modified since the last update. When the processing of the signatures in the system index is finished, the temporary index includes file signatures for the modified files whose signatures are not found in the archive index. These modified files are archived for backup purposes and the temporary index is saved to the archive to keep as a vision history.

Figure 4:
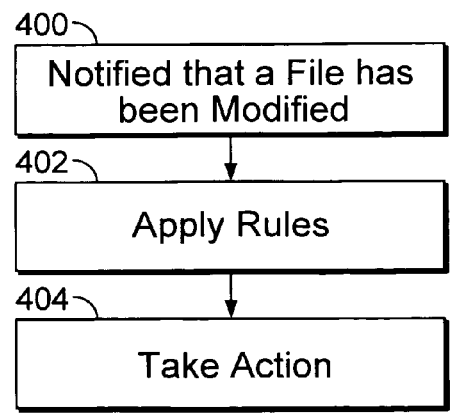
FIG. 4 is a flowchart illustrating the process of a modified file according to one embodiment.

FIG. 4 is a flowchart illustrating the process of a modified file according to one embodiment. In this example, a notification indicating that a file has been modified is received (400). There are several ways to determine whether a file has been modified. In some embodiments, the system index may be compared with the archive index to identify any modifications. In some embodiments, a detection component built into the operating system detects file changes as they occur and sends out notification. Once it is determined that a file has been modified, a set of rules are applied to determine whether a security incident has occurred; in the event that a security incident has occurred, a priority is assigned to such an incident. Appropriate action is then taken based on the outcome of the rules (404). Examples of such actions include blocking access of certain users or addresses, sending alerts to system administrators, restoring modified file from archive, removing the system from the network, quarantining the modified file by moving it to a safe place or otherwise making it harmless until it is examined more closely, etc.

Figure 5:
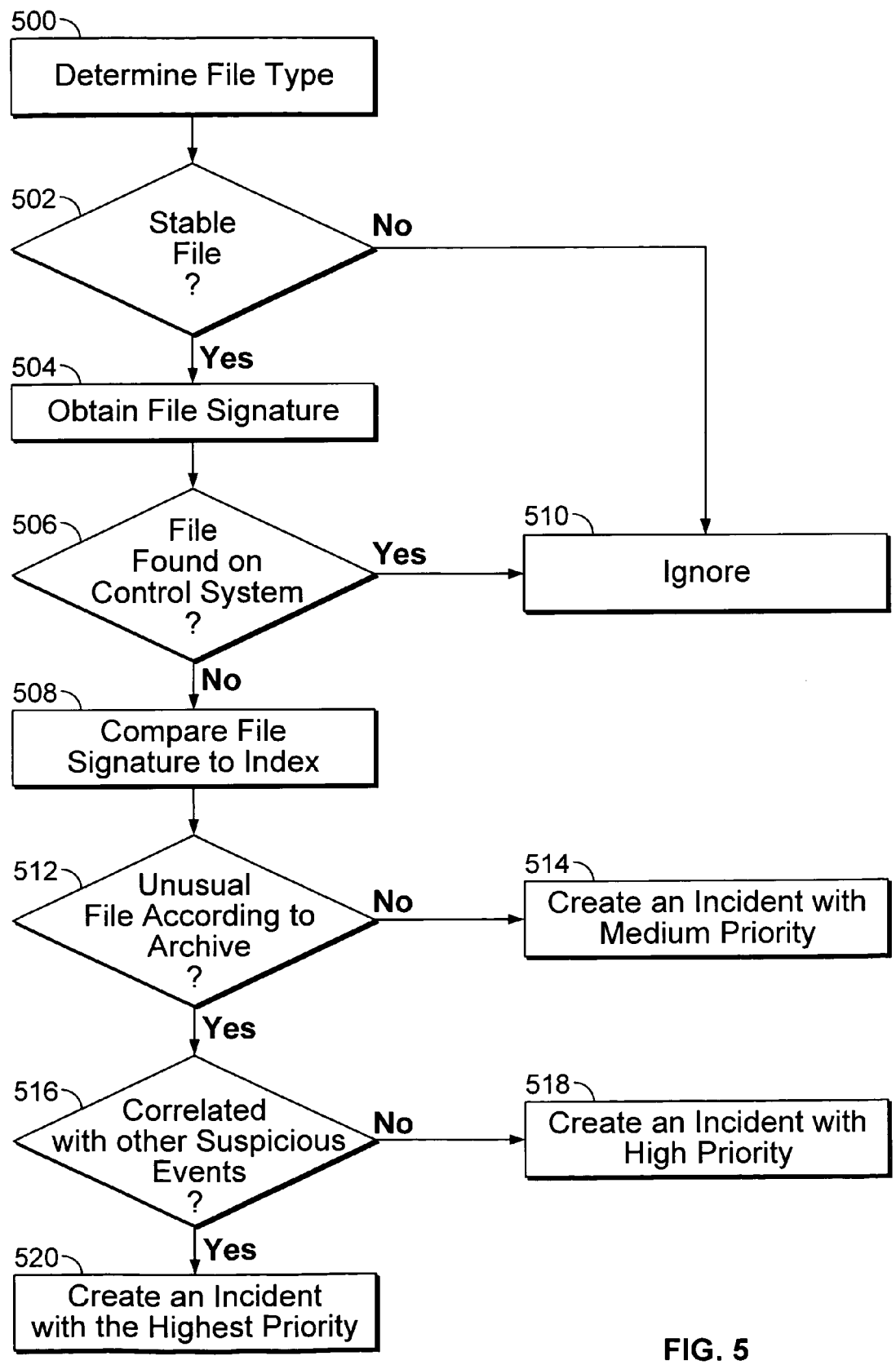
FIG. 5 is a flowchart illustrating the processing of a modified file according to another embodiment.

FIG. 5 is a flowchart illustrating the processing of a modified file according to another embodiment. In this example, the file type of the modified file is determined (506). This may be achieved by examining the file extension and/or examining the related applications. It is then determined based on the file type whether the file is a stable one (502). Stable files include as executables, configuration files, system files or any other type of files that are relatively static and do not change very much. Unstable files such as word documents, temporary files, log files, etc. are ignored in this embodiment (510).

If it is determined that a file is stable, the file signature is obtained (504). In some embodiments, the network includes a control system. The control system is mainly used to insure that installed applications work together and that patches do not cause failures in the system. Since the control system is relatively stable and the files stored on the control systems do not pose a threat to the system, the system index of the control system may be used to help identify files that are different from the typical installation. When a control system is present, it is optionally determined whether the file is found on the control system (508). If the file is found on the control system, it is deemed to be part of the standard installation and is therefore ignored (510).

If, however, the file is not found on the control system, the file signature is then compared to the archive index (508). It is then determined whether the file is unusual according to the archive. Unusual files are files that are not commonly found on the network. Unusual files deserve special attention since they may be risky files such as viruses, Trojan horses, unauthorized installations or patches, etc. The criteria for unusualness may vary for different embodiments and may be user configurable. In some embodiments, a file is determined to be unusual if it cannot be found elsewhere in the archive index. In some embodiments, a file is determined to be unusual if the number of occurrences of the corresponding file signature in the archive index is below a threshold. If a file is not unusual, an incident with medium priority is created (514). The handling of the incident is implementation dependent. In some embodiments, log messages and alerts are generated.

If the file is determined to be unusual, it is then correlated with activities monitored by the correlation engine. If the file does not have any correlation with other events, an incident with a medium or high priority is created (518). If, however, the file modification is correlated with other events, an incident with the highest priority is created (520). For example, if it is determined that an unusual file has been installed on a device, and if the device has been probed and had several administrator login failures, it is likely that the device has been compromised and a highest priority incident is created.

A technique for protecting a computer environment has been disclosed. In some embodiments, a security incident is identified by comparing an event with an index and determining whether the event is unusual. There are various ways to handle the security incident. For example, in some embodiments, a degree of unusualness is determined for the event; in some embodiments, an incident associated with the event is assigned a priority level based on the degree of unusualness.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for protecting a computer environment, comprising:
    generating a system index that includes a plurality of signatures of files in the computer environment at a system index time;
    comparing the system index with an archive index, the archive index including a plurality of signatures of files in the computer environment at a respective plurality of archive times;
    generating a first event if the comparison indicates that a file in the computer environment has been modified since its archive time; and
    determining whether a correlation exists between the first event and a second event generated in connection with a monitoring process associated with the computer environment.

2. The method for protecting a computer environment as recited in claim 1, wherein comparing includes looking up an identifier of a file in the archive index.

3. The method for protecting a computer environment as recited in claim 2, wherein the identifier includes a signature.

4. The method for protecting a computer environment as recited in claim 2, wherein the identifier includes a signature generated by a hash function.

5. The method for protecting a computer environment as recited in claim 2, wherein the identifier includes a signature generated by a checksum function.

6. The method for protecting a computer environment as recited in claim 1, wherein the first event indicates that a file has been modified, and comparing includes comparing a number of occurrences of the file in the archive index with a threshold.

7. The method for protecting a computer environment as recited in claim 1, wherein determining whether a correlation exists includes looking up an identifier of a file in the archive index.

8. The method for protecting a computer environment as recited in claim 1, wherein determining whether a correlation exists includes correlating the second event with the first event.

9. The method for protecting a computer environment as recited in claim 1, wherein determining whether the second event is a monitored event.

10. The method for protecting a computer environment as recited in claim 1, wherein a correlation exists includes applying a rule.

11. The method for protecting a computer environment as recited in claim 1, further comprising determining a priority of a security incident if it is determined that a correlation exists between the first event and the second event.

12. The method for protecting a computer environment as recited in claim 1, further comprising determining a degree of unusualness for the first event.

13. The method for protecting a computer environment as recited in claim 1, further comprising determining a degree of unusualness for the first event and determining a priority of a security incident based on the degree of unusualness.

14. The method for protecting a computer environment as recited in claim 1, wherein the archive index includes a file signature.

15. The method for protecting a computer environment as recited in claim 1, wherein the archive index includes file revision information.

16. The method for protecting a computer environment as recited in claim 1, wherein the archive index is stored in a database.

17. The method for protecting a computer environment as recited in claim 1, wherein the archive index is stored in an extensible markup language (XML) file.

18. The method for protecting a computer environment as recited in claim 1, wherein the archive index is cached.

19. A system for protecting a computer environment, comprising:
   a processor configured to:
      generate a system index that includes a plurality of signatures of files in the computer environment at a system index time;
      compare the system index with an archive index, the archive index including a plurality of signatures of files in the computer environment at a respective plurality of archive times;
      generate a first event if the comparison indicates that a file in the computer environment has been modified since its archive time; and
      determine whether a correlation exists between the first event and a second event generated in connection with a monitoring process associated with the computer environment; and
   a memory coupled with the processor, wherein the memory is configured to provide the processor with instructions.

20. A computer program product for protecting a computer environment, the computer program product being embodied in a non-transitory computer readable storage medium and comprising computer instructions for:
   generating a system index that includes a plurality of signatures of files in the computer environment at a system index time;
   comparing the system index with an archive index, the archive index including a plurality of signatures of files in the computer environment at a respective plurality of archive times;
   generating a first event if the comparison indicates that a file in the computer environment has been modified since its archive time; and
   determining whether a correlation exists between the first event and a second event generated in connection with a monitoring process associated with the computer environment.

\* \* \* \* \*